United States Patent [19]
Cabe et al.

[11] Patent Number: 5,377,940
[45] Date of Patent: Jan. 3, 1995

[54] SELF-RESTRAINING LOOP CLAMP

[75] Inventors: Carlton L. Cabe, Watagua; Andrew T. Hill, Fort Worth, both of Tex.

[73] Assignee: Bell Helicopter Textron Inc., Fort Worth, Tex.

[21] Appl. No.: 34,347

[22] Filed: Mar. 19, 1993

[51] Int. Cl.$^6$ .............................................. F16L 3/08
[52] U.S. Cl. ................................. 248/74.3; 248/68.1
[58] Field of Search ................... 248/74.1, 74.2, 74.3, 248/68.1

[56] References Cited

U.S. PATENT DOCUMENTS

| | | | |
|---|---|---|---|
| 2,340,712 | 2/1944 | Tinnerman | 248/74.3 |
| 2,397,279 | 3/1946 | Le Vesconte | 248/74.3 |
| 2,692,746 | 10/1954 | Thomas | 248/74.3 |
| 3,376,004 | 4/1968 | Goldman | 248/74.3 |
| 3,460,788 | 8/1969 | Goldman | 248/74.3 |
| 3,815,855 | 6/1974 | Appleton | 248/74.3 |
| 3,995,795 | 12/1976 | Hogan | 248/74.3 X |
| 4,460,139 | 7/1984 | Bochen et al. | 248/74.3 X |
| 4,844,379 | 7/1989 | Umehara | 248/74.3 |
| 5,129,608 | 7/1992 | Goldman | 248/74.3 |

*Primary Examiner*—Ramon O. Ramirez
*Assistant Examiner*—Derek J. Berger
*Attorney, Agent, or Firm*—John M. Cone; William L. Clayborn

[57] ABSTRACT

A clamp for retaining electrical wires, fluid conduits or the like has restraining means adjacent to the inner ends of the clamp's legs. When the clamp is closed, the hook of a hook-shaped member adjacent to the upper leg passes through a slot adjacent to the lower leg and engages the outer surface of the clamp, thereby retaining the clamp in the closed position.

4 Claims, 1 Drawing Sheet

SELF-RESTRAINING LOOP CLAMP

TECHNICAL FIELD

The present invention relates to clamps used, e.g., to secure electrical wires, fluid conduits or the like to a support, for example, in an aircraft.

BACKGROUND

There are a number of existing clamps for securing electrical wires, conduits or the like to a support.

U.S. Pat. No. 2,972,461 (Balbach) discloses a hose clip 10 having a base 12 and a hose encircling portion 14. The clip is approximately rectangular in shape when in the closed position. At one of the short ends of the rectangle, an integral tab 16 of reduced width allows the clip to be bent around the objects to be retained, hoses 54 and 56. The other short end of the rectangle is comprised of a hook 18 and a flange 22. The flange includes an aperture 24 into which the hook 18 is guided when the clip is closed. Since the hose clip 10 relies on the hoses 54 and 56 to resiliently bias the hook 18 into engagement with the aperture 24, the hose clip 10 is not suitable for retaining bundles of wires or rigid conduits.

U.S. Pat. No. 4,674,720 (Fetsch) discloses a circular pipe saddle which has a detent closure displaced approximately 90 degrees from the point at which the pipe saddle is attached to its support. One end 2 of a saddle body 1 has an inwardly facing detent member 5. The other end 3 of the saddle body 1 has an outward facing J-shaped member having a passage 8 in its curved portion and a detent recess 14 in its long leg portion, the long leg portion of the J-shaped member being formed by a portion of the periphery of the saddle body. Between the passage 8 and the detent recess 14 is a crosspiece 10. When the saddle body 1 is closed, the detent member 5 passes through passage 8, into detent recess 14, and engages crosspiece 10. In the closed position, the detent member 5 is held against crosspiece 10 by the flexible biasing action of end portion 9, the end portion 9 being the short leg of the J-shaped member. Because the end of the detent member 5 projects into the area occupied by the clamped object or objects, it can damage the clamped object or objects.

The loop clamp disclosed in U.S. Pat. No. 2,692,746 (Thomas) is widely used in the aircraft industry. The Thomas clamp is an improved conventional loop clamp 32 which includes a resilient member 14 and a filler block 15 for cushioning the clamped object or objects. The clamp 32 is held in the closed position by the bolt or screw 10 which attaches the clamp to a support 11. A disadvantage of the Thomas clamp (and other conventional loop clamps) is that the resiliency of the clamp tends to hold it in the open position. As a result, the clamp is frequently difficult and time-consuming to install, especially when two or more clamps are stacked and attached to the same support with a single bolt.

The loop clamp disclosed in U.S. Pat. No. 3,376,004 (Goldman) includes means to latch the ear 36 and the foot 38 of the clamp 14 together prior to installation on a support. The latching means, a toggle 50 and a bridge 52, are located on the outer ends of the ear 36 and foot 38. Apertures 46 and 48 in the foot 38 and ear 36, respectively, receive a bolt 60 for securing the clamp to a support.

A disadvantage of the Goldman clamp is that the bridge 52 protrudes above the plane of the upper surface of the ear 36 when the snap clamp is closed, thus presenting a surface that is not perfectly flat. When stacking two or more clamps 32, a washer or other spacer must be placed between them to prevent deforming the ears 36 and feet 38 of the clamps 32 when the bolt 60 is tightened.

Another disadvantage of the Goldman clamp is that the tongue 50 and ear 36 combination is longer than the corresponding ear 18 of the conventional loop clamp 14. In an installation intended for a conventional clamp 14, that additional length may result in interference with adjacent components. Thus, a Goldman clamp 34 is not interchangeable with a conventional clamp 14.

Another disadvantage of the Goldman clamp is that when the clamp 34 is in the latched position, a space exists between the inner ends of the ear 36 and the foot 36. In a clamp which does not include the filler block 42, that space may allow a loose wire to become sandwiched between the ear 36 and the foot 38 when the bolt 60 is tightened, possibly causing an electrical short.

The clamp disclosed in U.S. Pat. No. 4,460,139 (Bochen) is retained in the closed position by the engagement of two tabs 28 with two arresting lugs 30. That engagement is maintained by the bias exerted by the fuel lines 4 on the leg 22 and by the resiliency of the clamping strip 16 at the designated point of bending 18. When used for wire bundles or rigid conduits, it is possible for the clamp 2 to open due to vibration or other physical stress. In addition, the clamp is attached to the support by means of a mounting bracket 6 comprised of a single thickness of the clamp material, which may provide insufficient rigidity.

SUMMARY OF THE INVENTION

An object of the present invention is to provide a clamp that overcomes the disadvantages of conventional loop clamps and the clamps described above. The present invention provides a clamp in which a novel restraining means retains the legs of the clamp in the closed position prior to its installation on a support, making that installation more easily accomplished.

The restraining means comprises a hook-shaped member adjacent to the upper leg of the clamp. The hook-shaped member comprises an inwardly-projecting shank and an outwardly-projecting hook. When the clamp is closed, the hook passes through a slot adjacent to the lower leg of the clamp and engages the outer surface of the clamp, thereby retaining the clamp in the closed position.

In the closed position, the hook-shaped member prevents loose wires from becoming trapped between the legs of the clamp, as the shank forms a physical barrier that holds the wires within the loop of the clamp. An optional resilient liner covers the interior surface of the clamp and prevents chafing and vibration of the clamped object or objects.

The invention will now be described in detail with reference to the accompanying drawings, wherein:

DESCRIPTION OF THE PREFERRED EMBODIMENT

Figure 1:
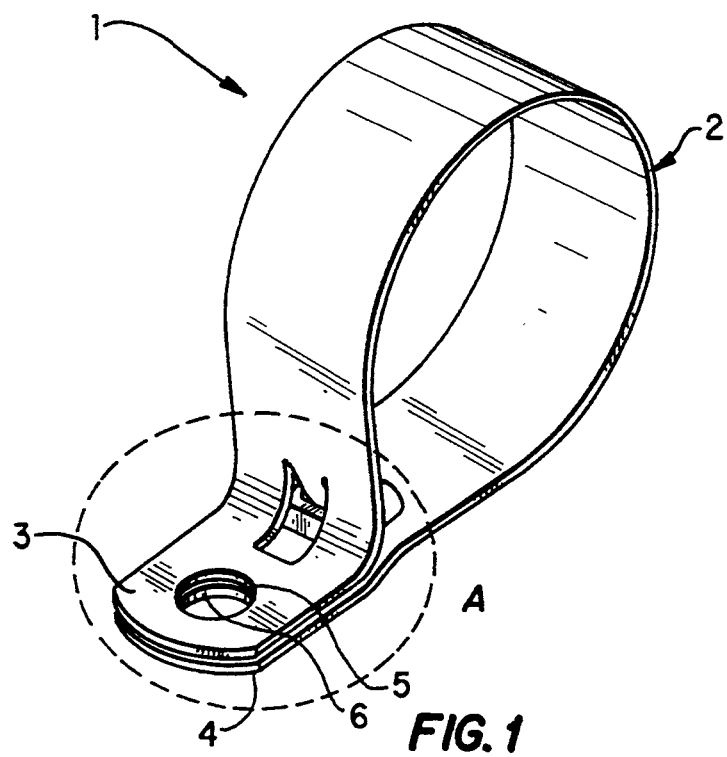
FIG. 1 is a perspective view of a clamp embodying the present invention in the closed position and without the optional resilient lining.

Referring to FIG. 1, a loop clamp 1 has a strap 2, the ends of which form an upper leg 3 and a lower leg 4. The legs 3 and 4 have respective apertures 5 and 6 through which a fastener, such as a screw or bolt (not shown), passes in order to attach the clamp 1 to a support (not shown). The strap 2 is constructed of a suitable material, such as steel or aluminum alloy.

Figure 2:
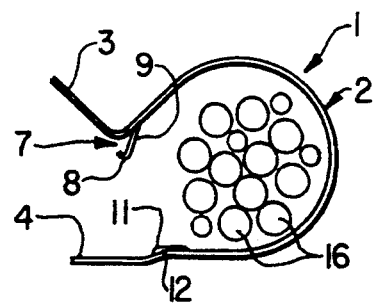
FIG. 2 is a side view of the clamp in FIG. 1 in the open position.
Figure 3:
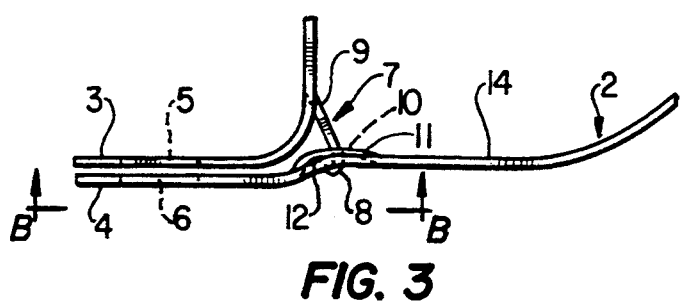
FIG. 3 is an enlarged side view of the area designated by the letter A in FIG. 1.
Figure 4:
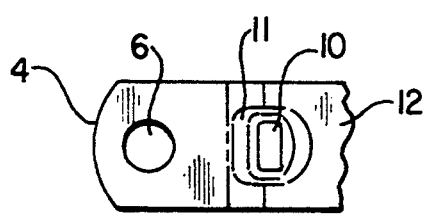
FIG. 4 is a plan view taken through the plane B—B in FIG. 3.

Referring to FIGS. 2-4, an integral hook-shaped member 7 projects inwardly at an acute angle to the strap 2. The hook-shaped member 7 comprises a shank 8 and a hook 9. The hook 9 projects outwardly toward the upper leg 3. A slot 10 in an embossed area 11 in the strap 2 is positioned so that when the upper and lower legs 3 and 4 are brought together (when the loop clamp 1 is closed), the hook 9 passes through the slot 10 and engages an outer surface 12 of the strap 2. In the closed position, the hook 9 is biased into contact with the outer surface 12 of the strap 2 by the resilience of the strap 2. As a result, the loop clamp i is retained in the closed position. If desired, the loop clamp 1 can be reopened by pressing the hook 9 inwardly.

When the loop clamp 1 is in the closed position, the shank 8 of the hook-shaped member 7 prevents any loose wires 16 from entering the area between the upper and lower legs 3 and 4.

Figure 5:
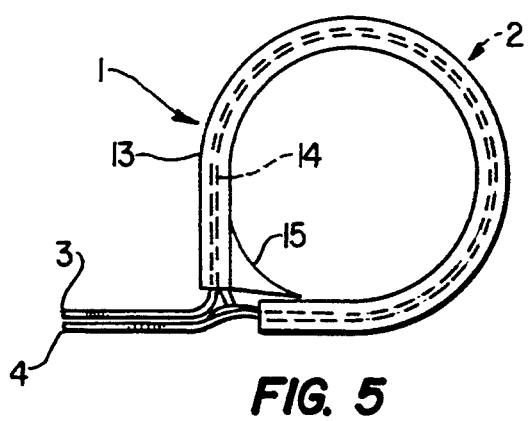
FIG. 5 is a side view of the clamp shown in FIG. 1 with the optional resilient lining.

Referring to FIG. 5, an optional resilient liner 13 covers an inner surface 14 of the strap 2. The liner 13 includes an integral filler block 15. When the loop clamp 1 is used to clamp a bundle of wires 16, the liner 13 insulates the wires from the clamp 1 physically and electrically, thereby preventing chafing and shorting of the wires 16. When the loop clamp 1 is used to clamp conduits (not shown), the liner 13 reduces vibration and prevents chafing of the conduits.

While the preferred embodiment of the invention has been shown and described, it will be apparent to those skilled in this art that various modifications may be made to this embodiment without departing from the spirit of the present invention. For that reason, the scope of the invention is set forth in the following claims.

What is claimed is:

1. A self-restraining loop clamp comprising:
   a strap bent to form a loop terminating in two opposed, substantially flat legs that can be brought together in an overlying relationship to secure one or more wires, one or more conduits, or the like within said loop;
   each said leg having an aperture for receiving a fastener therethrough;
   a retaining member comprising a shank having a hook at one end thereof, said shank projecting inwardly from an inner surface of said loop; and
   a slot in said loop positioned to receive said hook in an engaging relationship when said legs are brought together.

2. A clamp as claimed in claim 1 further comprising a resilient liner covering the inner surface of said loop.

3. A clamp as claimed in claim 2 wherein said resilient liner has two ends, one of said ends having an inwardly-projecting filler block, which block contacts the other of said ends when said ends of said legs are in close proximity to each other.

4. A clamp as claimed in claim 1 wherein said slot is located in an inwardly-projecting embossed area in said loop.

* * * * *